United States Patent [19]

Hunter

[11] Patent Number: 4,854,840

[45] Date of Patent: Aug. 8, 1989

[54] MOLD GATE HAVING MULTIPLE VALVE STEM RECEIVING APERTURES

[75] Inventor: Stephen B. Hunter, Dardanelle, Ark.

[73] Assignee: The Firestone Tire & Rubber Company, Akron, Ohio

[21] Appl. No.: 160,386

[22] Filed: Feb. 25, 1988

[51] Int. Cl.$^4$ .............................................. B29C 35/02
[52] U.S. Cl. ...................................... 425/32; 425/45; 156/500
[58] Field of Search .................. 156/500, 120; 249/83, 249/85, 96; 425/116, 117, 127, 32, 35, 44, 182, 192, 34.1, 45, 195

[56] References Cited

U.S. PATENT DOCUMENTS

| | | | |
|---|---|---|---|
| 1,773,810 | 8/1930 | Fairchild | 425/45 |
| 2,318,378 | 5/1943 | Crowley | 425/45 |
| 2,358,126 | 9/1944 | Burkley | 425/45 |
| 2,689,377 | 9/1954 | McCord | 425/45 |
| 2,697,252 | 12/1954 | Clark | 425/44 |
| 3,025,569 | 3/1962 | Rigs | 264/154 |
| 3,393,428 | 7/1968 | Kowalski | 425/330 |
| 3,743,564 | 7/1973 | Gross | 425/45 |
| 3,819,791 | 6/1974 | Ayers | 425/45 |
| 3,847,631 | 11/1974 | MacMillan | 425/32 |
| 4,010,052 | 3/1977 | Edwards | 156/120 |

Primary Examiner—Willard Hoag
Attorney, Agent, or Firm—Ronald Brietkrenz

[57] ABSTRACT

A mold gate for an inner tube mold is provided with a plurality of apertures for selectively receiving valve stems therein for bonding to the inner tube. A plug is inserted into each of the nonselected apertures to enable the single gate to be used to cure inner tubes having different valve positions to eliminate changing the gate each time a different valve location is required for a given mold. When the valve stem receiving openings are in close proximity to each other an elongated plug is placed in an elongated gate aperture to selectively seal one of the two valve stem openings while enabling the other opening to remain unblocked for receiving a valve stem during the molding operation.

20 Claims, 2 Drawing Sheets

MOLD GATE HAVING MULTIPLE VALVE STEM RECEIVING APERTURES

TECHNICAL FIELD

The invention relates to molds for molding annular articles and in particular to a mold having a gate for receiving a valve stem for molding into an inner tube of a pneumatic tire. More particularly the invention relates to such a mold gate having multiple valve stem receiving apertures in combination with plugs whereby a single mold gate can be used for a plurality of different valve stem positions.

BACKGROUND ART

Annular elastomeric articles such as inner tubes for pneumatic tires are molded in heated molds which are provided with a gate for receiving a valve stem which is bonded to the inner tube during the molding procedure. These valve stems usually are rubber covered stems used for passenger vehicle tires or may be various sizes and configurations of brass stems used for large truck tires. A single size tire and in particular the inner tubes therefor may have various valve stem positions depending upon the particular application in which the inner tubes are intended for use. Heretofore each inner tube valve stem location required a separate gate which had to be built and maintained in inventory and precision ground to fit a specific mold. Thus, when inner tubes with different valve positions or offsets as referred to in the molding art, were cured in the same mold, a complete gate change had to be made for each separate valve stem location. This gate change required time consuming delays and operating procedures and increased setup time. These multiple gates also required that each gate had to be ground and refitted to the inner tube cavity after periodic recutting of the cavity, again requiring increased downtime and subsequent setup time.

Examples of prior art in the inner tube mold curing art and associated valve stems are shown in U.S. Pat. Nos. 2,689,377; 3,819,791 and 4,010,052. None of these prior art molds and valve stem insertion apparatus and procedures disclose or suggest any solution to the problem of gate replacement for each different valve stem offset or angular position in the final molded inner tube.

There is no known apparatus or device of which I am aware which enables valve stems having different offset or angular positions to be molded or bonded to an inner tube during the molding of the inner tube in a single valve stem gate.

DISCLOSURE OF THE INVENTION

Objectives of the invention include providing a valve gate with multiple offset valve stem receiving apertures formed therein, which gate is mounted in an inner tube mold to enable valve stems to be located at various angular positions with respect to the inner tube for subsequent bonding to the inner tube during the molding thereof, without requiring replacement of the valve gate as heretofore required in the inner tube molding art.

Another objective is to provide such an improved mold gate which is formed with a plurality of apertures, and in which various insert bodies serve as plugs for selective placement in certain of the apertures to plug the apertures while permitting a single aperture to remain open during the inner tube molding for receiving the valve stem therein.

A further objective is to provide such a mold gate wherein two relatively close valve stem positions can be provided in the gate which form a single elongated aperture in the mold gate, and together with various configured plugs when mounted in the elongated aperture, provides a single stem receiving opening at various angular positions; and in which in the alternative, an elongated plug, can completely close or seal the elongated aperture permitting a separate and more distant aperture to remain open for receiving the valve stem for bonding with the inner tube.

A still further objective of the invention is to provide such a mold gate which eliminates gate changes and extra gates for many valve stem positions and operations, and which reduces mold damage and setup time, and reduces the cost of recutting the molds and assoicated precision grinding of the mold gate for incorporation into recut molds.

A further objective is to provide such a mold gate in which valve location changes are made easily, quickly and accurately by removing one or more plug inserts and installing one or more other plug inserts into various mold apertures to provide a desired open aperture for receiving a valve stem while closing the other gate apertures not in use; and in which the plugs are relatively inexpensive, metal components having a concave inner surface which coincides with the curved inner surface of the mold wall thereby eliminating blemishes or uneven gauge in the wall of the final molded inner tube.

These objectives and advantages are obtained by the improved mold gate of the invention, the general nature of which may be stated as including a mold gate adapted to be removably mounted in an opening formed in an interior wall of a mold cavity of the type used for molding annular articles, wherein the gate is adapted to receive a valve stem to be bonded to said article; said gate including at least two apertures formed therein for selectively receiving a valve stem in a selected one of said apertures, and plug means for insertion into the other of said apertures so that the mold gate can accommodate the molding of annular articles having at least two different valve stem locations thereon.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
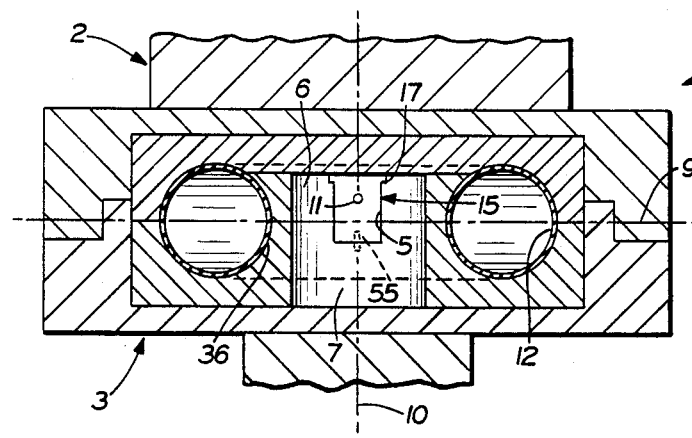
FIG. 1 is a general diagrammatic sectional view of an inner tube mold in closed position with a tube and valve stem being molded therein.
Figure 2:
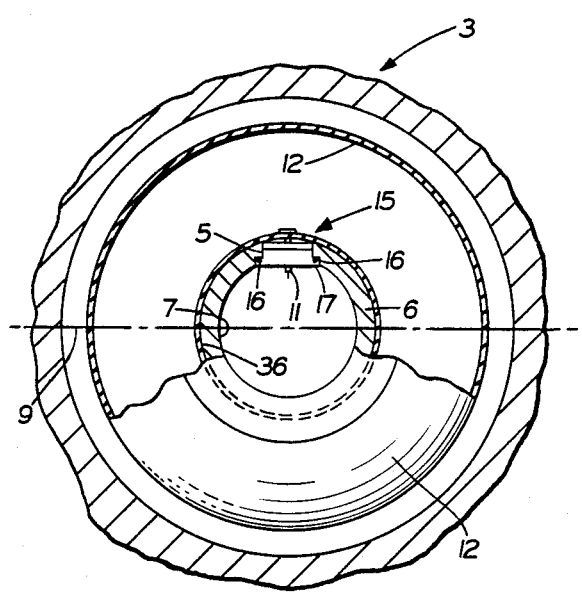
FIG. 2 is a diagrammatic top elevational view of the bottom half of the mold of FIG. 1 with the inner tube and valve stem shown therein.

A usual mold of the type for molding annular articles and in particular for molding inner tubes for use in pneumatic tires, is indicated generally at 1, and is shown particularly in FIGS. 1 and 2. Mold 1 consists primarily of top and bottom mold halves 2 and 3, respectively, one or both of which are movable by appropriate pressure actuated cylinders and the like (not shown) between open and closed positions. An inner tube in the green state is placed into the mold when in open position for subsequent molding under the application of heat and pressure. Mold 1 is of a usual construction well known in the art. Also the molding procedure carried out within mold 1 is well known in the art and performs no particular part of the invention. As shown in FIGS. 1 and 2 of the drawings, a slot 5 is formed in the upper periphery 6 of bottom mold half 3 and extends partially downwardly in an inner annular wall 7 thereof. A mold gate is adapted to be slidably received in slot 5, and in the prior art was provided with a single aperture for receiving a valve stem for subsequent bonding to the inner tube being cured within mold 1. The apertures in the prior art mold gates are formed at predetermined angles with reference to an imaginary radial line 9 which passes through the center of the bottom half 3 of mold 1, which line is perpendicular to the mold axis 10. The particular angular relationship or offest of the valve stem is generally referenced with respect to radial line 9.

In the prior art valve gates a single aperture was provided at a predetermined angular relationship with respect to radial line 9 for bonding the valve stem to an inner tube 12 at the desired angular position. Various inner tubes, depending upon their final application and use, will have valve stems bonded thereon at various angular positions.

Figure 3:
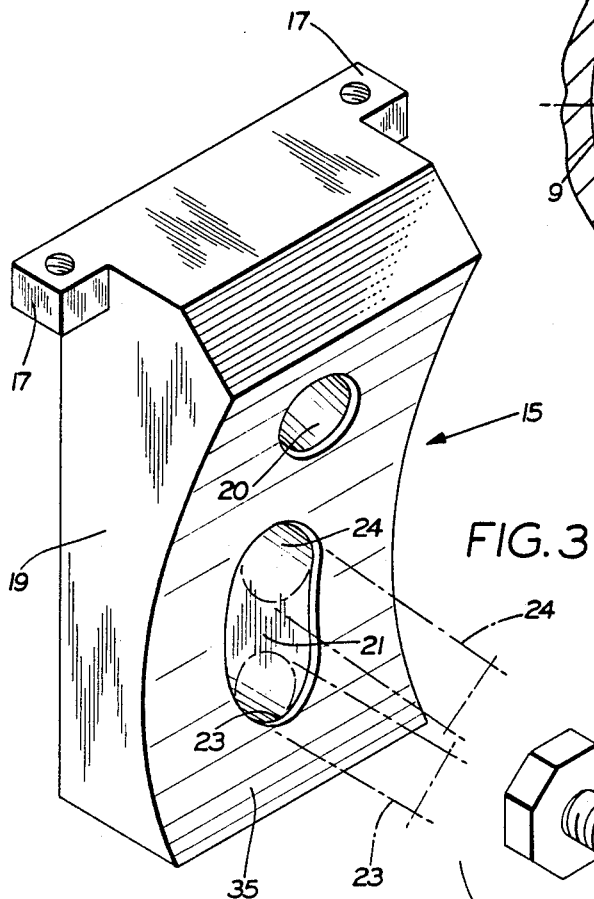
FIG. 3 is an enlarged perspective view of a mold gate of the invention formed with a pair of valve stem receiving apertures.
Figures 8, 9:
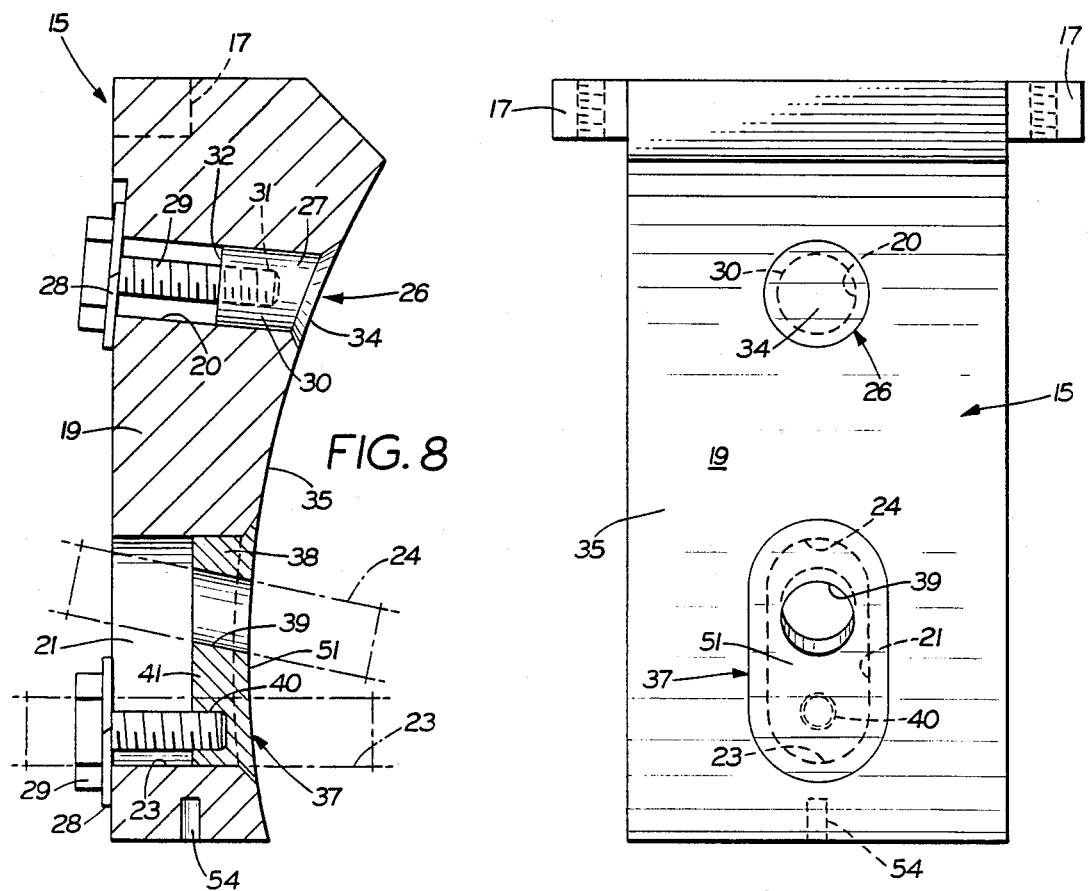
FIG. 8 is a vertical sectional view of the mold gate with the plugs of FIGS. 4 and 5 being shown mounted therein.
FIG. 9 is a right hand elevational view of the mold gate and plug inserts of FIG. 8.

In accordance with the invention, the improved mold gate is indicated generally at 15, and is shown particularly in FIGS. 3, 8 and 9. Gate 15 is adapted to be slideably received within slot 5 of lower mold half 3 in a similar manner as the prior art mold gates. Gate 15 is secured in slot 5 by a pair of bolts 16 (FIG. 2) which extend through outwardly extending lugs 17 formed on the top portion of the mold gate for engagement in complementary-shaped aligned threaded holes formed in upper periphery 6 of bottom mold half 3. This mounting arrangement is well known in the art and is used for the usual single aperture mold gate and therefor does not require modification of existing molds when using improved gate 15.

Improved mold gate 15 (FIG. 3) is formed of a precision ground metal block which forms a main body 19 thereof which is provided with a plurality of apertures precision ground and formed therein. The number, size and angular relationship of the various apertures which may be provided in body 19 may vary between the various gates without effecting the concept of the invention. The particular aperture number and configuration shown in the drawings and described below is illustrative of just one mold gate aperture configuration, and the invention need not be limited to that shown and described.

Mold gate 15 includes a first upper aperture 20 which has a circular cross-sectional configuration which extends at an angular relationship with respect to radial line 9, and a second elongated oval-shaped lower aperture 21. Aperture 21 is of a size sufficient for forming two individual stem receiving openings and in particular a bottom opening 23 coinciding with radial center line 9 and a second offset angular opening indicated at 24, spaced slightly above opening 23. Openings 23 and 24 are shown in phantom in FIGS. 3 and 8 and may be of a size and configuration generally similar to that of aperture 20.

Figure 4:
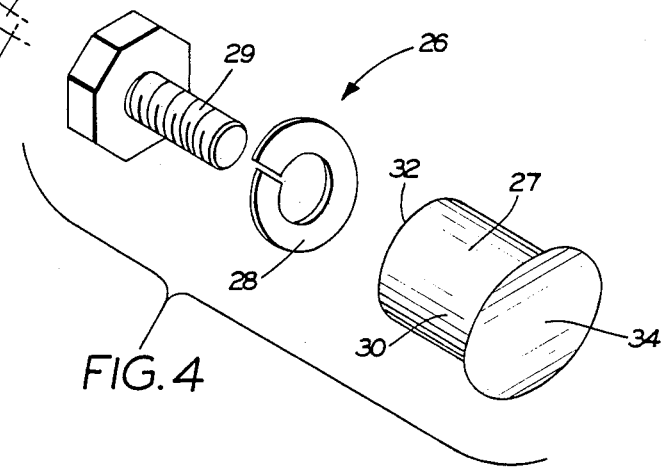
FIG. 4 is an exploded perspective view of one insert plug for mounting in the mold gate of FIG. 3 for sealing one of the valve stem apertures thereof.

In further accordance with the invention, apertures 20 and 21 are selectively plugged with various configured inserts, shown particularly in FIGS. 4-7. FIG. 4 illustrates a single apperture plug indicated generally at 26, which is adapted to be received in upper aperture 20 for sealing the same when not in use. Single plug 26 includes an insert body 27, a lock washer 28 and a mounting bolt 29.

Insert body 27 has a generally cylindrical body 30 formed with a threaded recess 31 (FIG. 8) in the rear face 32 thereof, into which bolt 29 is engaged for mounting body 30 in upper aperture 20 as shown particularly in FIGS. 8 and 9. The front face or surface 34 of insert body 30 is precision ground to match the inner concave surface 35 of mold gate 15 which in turn is precision ground to match the contour of inner surface 36 of mold wall 7. This prevents formation of grooves or other indentations into which the rubber of inner tube 12 would flow during molding thereof. Insert body 30 is mounted in upper aperture 20 as shown in FIG. 8 by bolt 29 extending through the aperture and into threaded recess 31, and together with lock washer 28 tightly clamping the insert body within aperture 20. Cylindrical body 30 is complementary to the configuration of aperture 20 so as to provide a sliding fit therebetween which, in combination with concave front face 34, eliminates any recess into which the rubber could flow.

Figures 5, 6, 7:
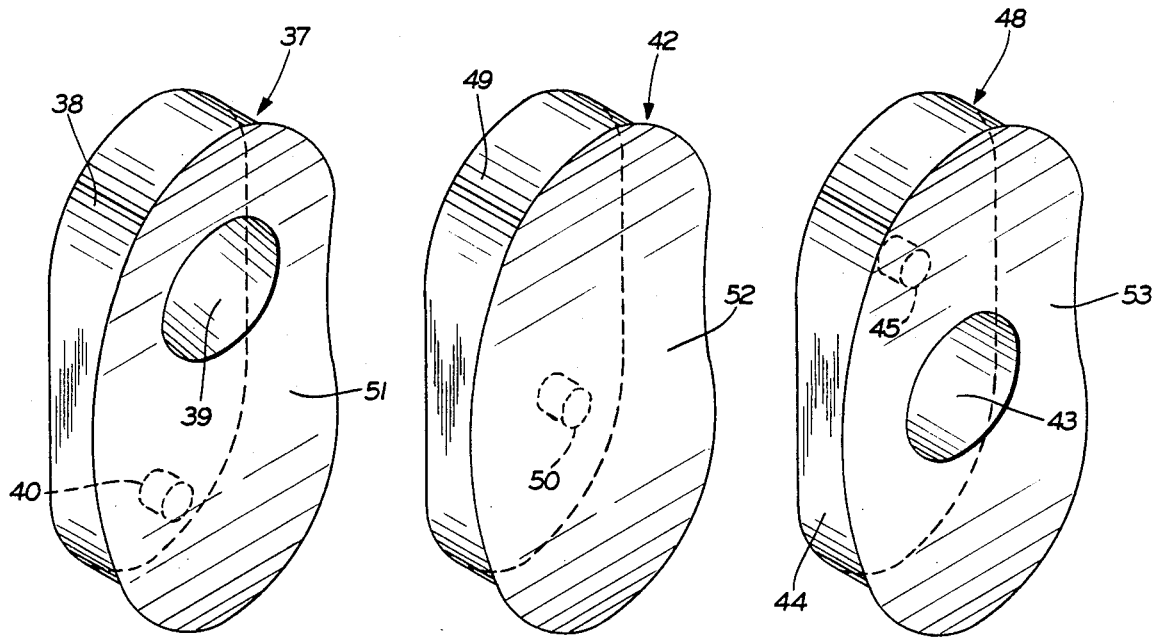
FIG. 5 is a perspective view of a plug insert body for sealing a portion of the elongated aperture shown in the mold gate of FIG. 3 to provide a single valve stem receiving opening.
FIG. 6 is a perspective view of another plug body for completely sealing the elongated aperture of the mold gate shown in FIG. 3.
FIG. 7 is a perspective view of another plug body for sealing a portion of the elongated aperture shown in the mold gate of FIG. 3 to provide a single valve stem receiving opening offset from the opening provided by the plug body shown in FIG. 5.

A plurality of plugs for mounting in lower aperture 21 are shown in FIGS. 5, 6 and 7 and indicated generally at 37, 42 and 48, respectively. The particular plug chosen for use in mold 1 depends upon the particular valve stem location in the fixed molded inner tube. Plug 37 is adapted to be received in lower elongated aperture 21 when offset opening 24 is adapted to be provided for receiving a valve stem during a particular molding operation. Plug 37 includes an elongated oval-shaped insert body 38 having an offset hole 39 formed therein which aligns with and forms offset valve stem receiving opening 24 when mounted within aperture 21 by bolt 29 and lock washer 28. Bolt 29 is engaged within a threaded recess 40 formed in a solid lower portion 41 of insert body 38.

Thus, when an offset aperture position as indicated at 24 is desired to be provided in gate 15 for a particular valve stem location, a single aperture plug 26 is mounted in upper aperture 20 and aperture plug 37 is mounted in lower elongated apertrre 21. This provides single aperture hole 39 which corresponds with the desired single offset opening 24 for receiving a valve stem therein during molding of inner tube 12 within the mold.

Aperture plug 48 as shown in FIG. 7, provides a single valve stem receiving hole 43 which extends therethrough and which aligns with the imaginary center line aperture 23 of lower elongated aperture 21 when a center valve stem is desired to be bonded to the inner tube. Plug insert body 44 of plug 48 is similar to insert body 38 of plug 37 described above except for the position of the valve stem receiving hole therethrough. Insert body 44 is also formed with a threaded rear recess 45 for engagement with mounting bolt 29 and associated lock washer 28 when mounting plug 48 within elongated aperture 21.

When bonding a single offset valve stem in the position of upper aperture 20 to an inner tube, the third type of elongated plug 42 as shown in FIG. 6 is used for completely sealing and filling lower elongated aperture 21. Elongated plug 42 has an insert body 49 similar to insert bodies 38 and 44 described above, with the exception that no valve stem hole is formed therein. A single rear threaded recess 50 is provided for engagement with mounting bolt 29. Thus, when a valve stem 11 is desired at the upper aperture position, solid elongated plug 42 is mounted within elongated aperture 21.

Plugs 37, 42 and 48 all have concave front surfaces 51, 52 and 53, repsectively, which match inner surface 35 of gate 15 and inner surface 36 of annular mold wall 7 to eliminate any gaps or recesses into which the rubber of the inner tube would flow during molding thereof.

It is easily seen and understood that a considerable number of various sizes and locations of apertures and associated plugs may be formed in mold gate 15 within the scope of the invention for achieving various positions, sizes and arrangements of valve stems for bonding to an inner tube of a pneumatic tire. Likewise, mold gate 15 and its associated apertures and plugs can be used for molding other articles than inner tubes which have valve stems or other similar members incorporated into the member being molded.

As shown particularly in FIGS. 1 and 8 valve gate 15 will be provided with a bottom recess 54 for engagement with a positioning pin 55 located in mold slot 5 for positioning and retaining gate 15 within the slot. Furthermore a plurality of internal passages (not shown) may be formed within gate body 19 through which a heated fluid, such as steam, will flow during a molding operation. Such passages are used in existing valve stem gates having only a single aperture and form no particular part of the invention.

The improved mold gate provides a means of enabling various sizes and offset positions of valve stems to be used with the single gate for bonding to an inner tube during the molding thereof, eliminating replacement of the valve gate for each different valve stem location as heretofore required in prior art mold gates, thereby reducing molding costs by reducing both time and materials.

Accordingly, the improved mold gate is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved mold gate having multiple valve stem receiving apertures is constructed and used, the characteristics of the construction, and the advantageous, new and useful results obtained; the new and useful structures, devices, elements, arrangements, parts, and combinations, are set forth in the appended claims.

What is claimed is:

1. A hollow mold suitable for curing inner tubes having valve stems, said mold having a slot formed in an interior wall thereof; means defining a mold gate mounted in the wall slot and formed with an inner surface generally matching the contour of the interior wall and having at least two apertures, said apertures each being adapted to selectively receive a valve stem therein; and plug means removably secured in a selective one of said apertures for closing said one aperture with the other of said apertures adapted to receive a valve stem therein for bonding to an inner tube during the molding of said inner tube in said mold.

2. The mold defined in claim 1 in which the mold has top and bottom mold halves; in which the slot is formed in an upper peripheral edge of the interior wall of the bottom mold half; and in which the gate is removably mounted in said slot.

3. The mold defined in claim 1 in which at least one of said two apertures extends at an offset angular relationship with respect to a radial line extending through the mold and perpendicular to the axis of said mold.

4. The mold defined in claim 1 in which one of the apertures has a generally elongated configuration and is sized sufficiently to provide at least two separate openings for receiving valve stems therein positioned at two different offset angular relationships; and in which the plug means has a solid insert body which completely seals the elongated aperture so that a valve stem is adapted to be located within the other of said apertures formed in the gate.

5. The mold defined in claim 1 in which attachment means are formed on the gate for attaching the gate to the mold.

6. The mold defined in claim 1 in which the gate has a curved concave inner surface.

7. The mold defined in claim 6 in which the plug means has an insert body with a concave inner surface which matches concave inner surface of the gate.

8. The mold defined in claim 1 in which the plug means includes an insert having a body complementary to a respective one of the gate apertures and is adapted to be received in said one aperture, and has a concave curved surface with a curvature matching the curvature of an inner surface of the mold gate; and in which the insert body is secured within said one aperture by a bolt threadably engaged in an internally threaded recess formed in said insert body.

9. The mold defined in claim 8 in which a lock washer is clamped against the mold gate by the bolt to maintain said gate within the selected one aperture.

10. The mold defined in claim 1 in which one of the apertures has a generally elongated configuration and is sized sufficiently to provide at least two separate openings for receiving valve stems therein positioned at two different angular relationships; and in which said plug means is provided with an opening adapted to align with one of said valve stem openings for receiving one of the valve stems while sealing the remaining valve stem opening of said elongated aperture.

11. The mold defined in claim 10 in which the opening in the elongated plug means coincides with a radial line extending through the centerline of the mold and perpendicular to the axis of said mold.

12. The mold defined in claim 10 in which the opening in the elongated plug means is at an offset angular relationship to a radial line extending through the centerline of the mold and perpendicular to the axis of said mold.

13. The mold defined in claim 10 in which the plug means includes an elongated insert body complementary to the elongated aperture and is slidably received in said elongated aperture.

14. The mold defined in claim 5 in which an internally threaded recess is formed in the elongated insert body; and in which a bolt extends through the elongated aperture and is engaged in said recess for clamping the insert body within the elongated aperture.

15. A mold gate defining member removably mounted in an opening in an interior wall defining a mold cavity of the type suitable for molding an annular article; said member having an inner surface generally matching the contour of the interior wall of the mold cavity and defining at least two apertures suitable for receiving a valve stem alternatively in either of said apertures, and plug means for insertion into the other of said apertures so that said member can accommodate the molding of one of the annular articles having a valve stem in either of two alternative locations.

16. The improved mold gate defined in claim 15 in which the plug means includes an insert having a body complementary to the selected gate aperture and adapted to be received in said aperture, and has a concave curved surface matching the curvature of the inner surface of the mold gate; and in which the insert body is secured within the aperture by a bolt threadably engaged in an internally threaded recess formed in said insert body.

17. The mold defined in claim 21 in which one of the apertures has a generally elongated configuration and is sized sufficiently to provide at least two separate openings for receiving valve stems therein positioned at two different offset relationships; and in which said plug means has an elongated configuration complementary to the elongated aperture and is provided with an opening for receiving one of the valve stems while sealing the remaining portion of elongated aperture.

18. The mold defined in claim 17 in which the plug means has a concave surface complementary to an inner surface of the interior wall of the mold cavity.

19. The mold defined in claim 17 in which the plug means has an insert body formed with an internally threaded recess; and in which a bolt extends through the selected aperture and is threadably engaged with said insert body in said recess for clamping the insert body within said selected aperture.

20. The mold defined in claim 17 in which one of the apertures has a generally elongated configuration and is sized sufficiently to provide at least two separate openings for receiving valve stems therein positioned at two different offset relationships; in which the plug means is adapted to be slideably received in the elongated aperture; and in which the plug means has a solid body which completely seals the elongated aperture so that a valve stem is adapted to be located within the other of said apertures formed in the gate.

* * * * *